(12) United States Patent
Huang

(10) Patent No.: US 6,935,233 B1
(45) Date of Patent: Aug. 30, 2005

(54) SCREEN PRINTING METHOD FOR USE IN IML HOT PRESS, DIE CUTTING, INJECTION MOLDING

(76) Inventor: Jui Peng Huang, 59, Wu-Chun 7th Road, Wu-Ku Industry Park, Taipei County (TW)

( * ) Notice: Subject to any disclaimer, the term of this patent is extended or adjusted under 35 U.S.C. 154(b) by 0 days.

(21) Appl. No.: 10/850,332

(22) Filed: May 19, 2004

(51) Int. Cl.⁷ .............................................. B41M 1/12

(52) U.S. Cl. ...................... 101/129; 101/115; 101/211; 101/491

(58) Field of Search ........................ 101/114, 115, 211, 101/129, 483, 487, 488, 491, 424.1

(56) References Cited

U.S. PATENT DOCUMENTS

| 6,634,291 B2 * | 10/2003 | Huang | 101/129 |
| 6,732,642 B1 * | 5/2004 | Huang | 101/129 |
| 6,739,249 B1 * | 5/2004 | Huang | 101/211 |

* cited by examiner

*Primary Examiner*—Leslie J. Evanisko
(74) *Attorney, Agent, or Firm*—Pro-Techtor International Services

(57) ABSTRACT

A screen-printing method for use in IML hot press, die cutting, and injection molding is disclosed to print first, second, and third (special) colors of a four-color printing with ink mixtures containing different printing inks and a hardening agent with a bonding agent, and then to perform ex-design first, second and third screen printings, and then to process the semi-finished printing work thus obtained through a hot work die treatment, a die-cutting process, and an injection-molding process so as to obtain the desired finished product.

11 Claims, 2 Drawing Sheets

100# SCREEN PRINTING METHOD FOR USE IN IML HOT PRESS, DIE CUTTING, INJECTION MOLDING

BACKGROUND OF THE INVENTION

1. Field of the Invention

The present invention relates to a screen-printing method, which is practical for printing a regular color printing on a thin-film material as well as a metal (silver) or pearl color on the thin-film material.

2. Description of the Related Art

A conventional printing method for use in IML hot press, die cutting, and injection molding is a combination of off-set printing and screen-printing includes the steps of off-set printing, four-color design off-set printing, primary screen-printing, baking, secondary screen-printing, baking, hot work die, die cutting, and injection-molding.

At first, use an off-set printing machine to print a single piece base material (thin-film material) with a layer of "transparent thermal bonding agent". This "transparent thermal bonding agent" makes the base material compatible to the printing ink to be used latter, increasing the bonding power of the printing ink to the base material. The layer of "transparent thermal bonding agent" is then dried by the radiation of a 300 W UV light source of the off-set printing machine. Thereafter, the off-set printing machine is operated to print four-color printing inks or color printing inks assigned by client on the layer of "transparent thermal bonding agent", enabling the printing inks to be further dried by the radiation of the 300 W UV light source of the off-set printing machine. Thus, the part of off-set printing is finished.

Thereafter, a primary screen-printing procedure is employed to print a printing ink on the workpiece thus obtained through the aforesaid off-set printing procedure. The printing ink is selected subject to the assigned color design, and contains a thermal bonding agent. This primary screen-printing procedure enhances the light tight status and ink bonding power. After the primary screen-printing procedure, the printing is dried in a baking oven at about 75° C.~85° C. for about 18~25 minutes. This drying temperature and time may be adjusted subject to the type and thickness of the base material and the type of the printing ink used.

After the aforesaid primary screen-printing, it proceeds to a secondary screen-printing procedure to print a bonding agent on the printing processed through the aforesaid primary screen-printing procedure. This secondary screen-printing procedure is to the bonding power of the printing work during further injection-molding process. After the secondary screen-printing, the printing work is dried in a baking oven at about 75° C.~85° C. for about 18~25 minutes. This drying temperature and time may be adjusted subject to the type of the bonding agent used.

After the aforesaid printing procedure, the printing work thus obtained is then treated through a hot work die treatment in a hot press and then cooled down, and then the semi-finished product thus obtained is processed through a die cutting process, and then put in the mold of an injection-molding machine for injection-molding with a plastic material, and the desired finished product is thus obtained.

The aforesaid conventional printing method alternatively employs off-set printing and screen-printing techniques to print printing inks and thermal bonding agent on a thin0film base material. However, because metal (silver) and pearl color printing inks contain shining particles, it is not workable to print metal (silver) and pearl color printing inks on a thin-film base material by an off-set printing machine.

SUMMARY OF THE INVENTION

The present invention has been accomplished under the circumstances in view. It is therefore the main object of the present invention to provide a screen-printing method, which is practical for printing a regular color printing on a thin-film material as well as a metal (silver) or pearl color on the thin-film material.

The screen printing method comprises the steps of a) using a screen-printing machine to print a first color of a four-color printing on a thin-film material with a first ink mixture containing a first printing ink, a hardening agent and a bonding agent subject to a predetermined design, and then performing a primary drying process to dry the first color; b) using the screen-printing machine to print a second color of the four-color printing on the first color with a second ink mixture containing a second printing ink, a hardening agent and a bonding agent subject to the predetermined design, and then performing a secondary drying process to dry the second color; c) using the screen-printing machine to print a third (special) color of the four-color printing on the second color with a third ink mixture containing a third printing ink, a hardening agent and a bonding agent subject to the predetermined design, and then performing a third drying process to dry the third color; d) using the screen-printing machine to print a first ex-design printing on the third color with a fourth ink mixture containing a fourth printing ink, a hardening agent and a bonding agent, and then performing a fourth drying process to dry the first ex-design printing; e) using the screen-printing machine to print a second ex-design printing on the first ex-design printing with a fifth ink mixture containing a fifth printing ink, a hardening agent and a bonding agent, and then performing a fifth drying process to dry the second ex-design printing; f) using the screen-printing machine to print a third ex-design printing on the second ex-design printing with a printing ink, and then performing a sixth drying process to dry the third ex-design so as to obtain a semi-finished printing work; and g) processing the semi-finished printing work through a hot work die treatment, a die-cutting process, and then an injection-molding process so as to obtain a finished product.

DETAILED DESCRIPTION OF THE PREFERRED EMBODIMENT

Figure 1:
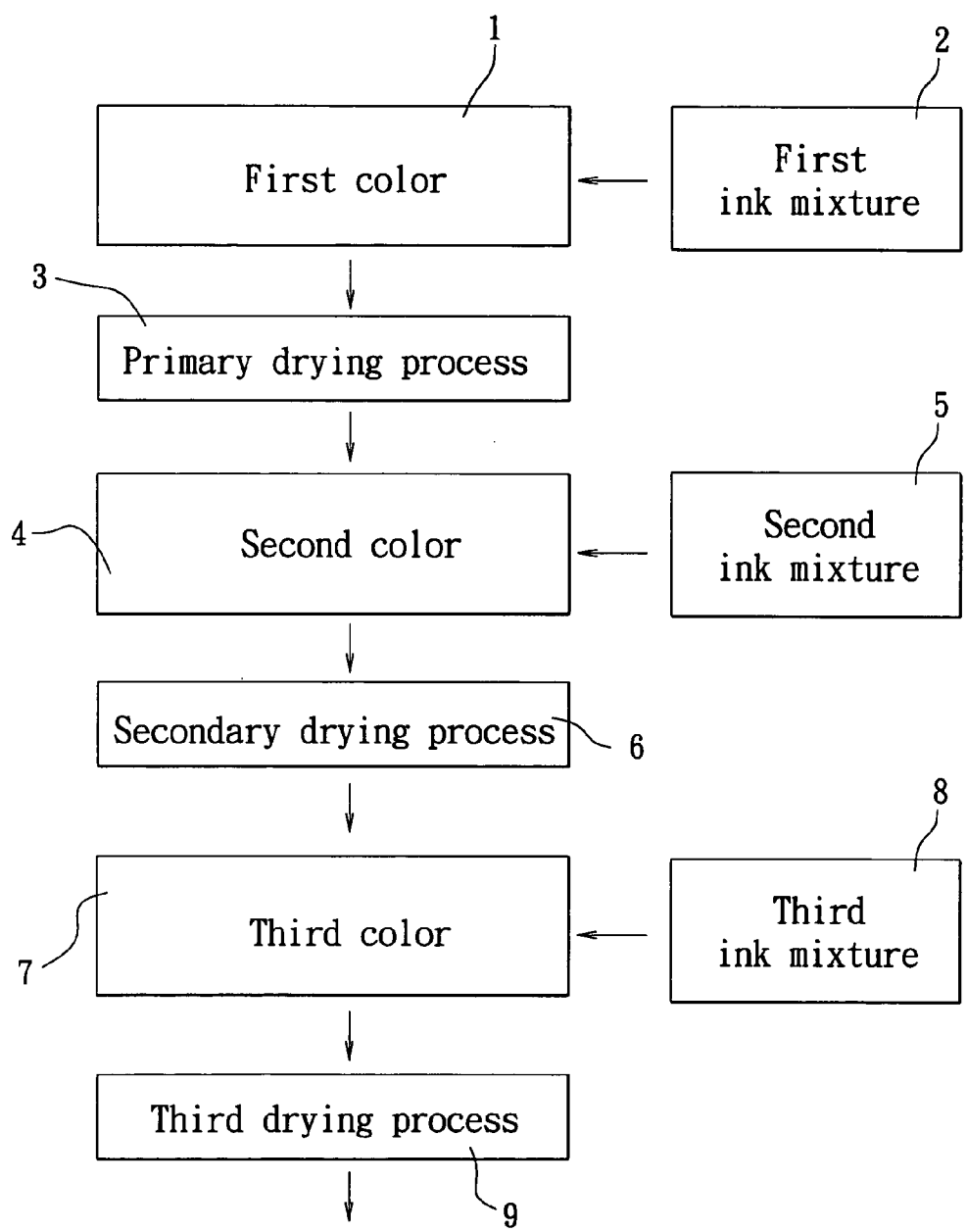
FIG. 1 is a flow chart of the screen-printing method according to the present invention (I).
Figure 2:
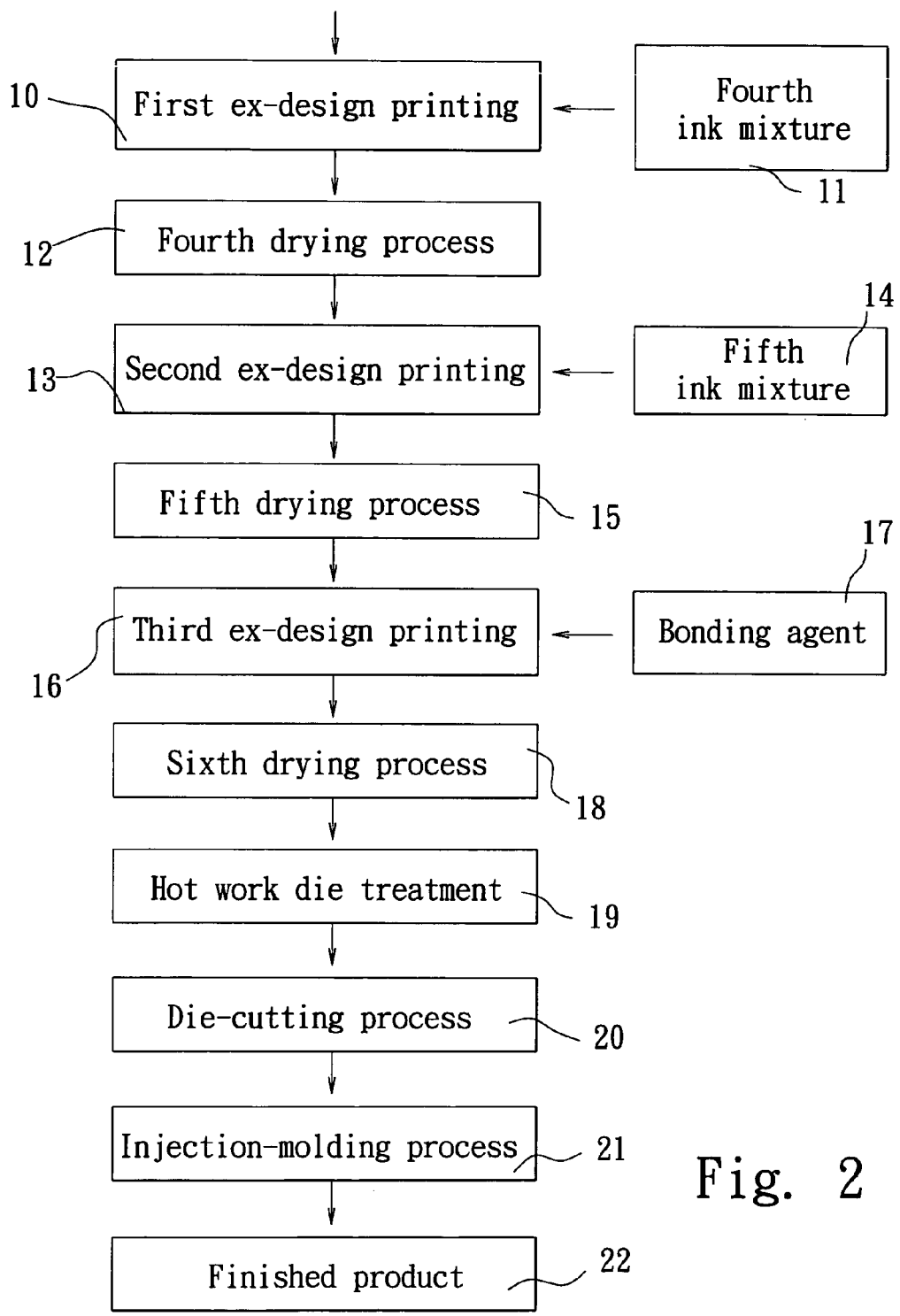
FIG. 2 is a flow chart of the screen-printing method according to the present invention (II).

Referring to FIGS. 1 and 2, the screen-printing method of the present invention is practical for use in IML hot press, die cutting, and injection molding to print a regular color printing on the workpiece. More particularly, the screen-printing method is practical for printing a metal (silver) or pearl color on the workpiece to form a metal (silver) or pearl color shell that provides a shining effect.

The first step of the screen-printing method is to print a first color 1 (of a four-color printing) on a thin-film material subject to a predetermined design. The first color 1 is formed of a first ink mixture 2 containing a first printing ink, a hardening agent and a bonding agent, and printed on the surface of the thin-film material by a screen-printing machine. After printing, the printing of the first ink mixture 2 is dried through a primary drying process 3 where the workpiece is dried in a baking oven at 75~100° C. for about 18~50 minutes. The use of the hardening agent is to protect the printing against scrapping. The drying time and drying temperature may be adjusted subject to the type and thickness of the thin-film material and the type of the first printing ink used.

After the aforesaid first step, it proceeds to the second step to print a second color 4 on the printing of the first ink mixture 2 at the thin-film material subject to the predetermined design. The second color 4 is formed of a second ink mixture 5 containing a second printing ink, a hardening agent and a bonding agent, and printed on the surface of the printing of the first ink mixture 2 at the thin-film material by the same screen-printing machine. After printing, the printing of the first ink mixture 2 is dried through a secondary drying process 6 where the workpiece is dried in a baking oven at 75~100° C. for about 18~50 minutes. The drying time and drying temperature may be adjusted subject to the type of the second printing ink used.

After the aforesaid second step, it proceeds to the third step to print a third (special) color 7 on the printing of the second ink mixture 5 of the second color 4 subject to the predetermined design. The third (special) color 7 is formed of a third ink mixture 8 containing a third printing ink, a hardening agent and a bonding agent, and printed on the surface of the printing of the second ink mixture 5 of the second color 4 by the same screen-printing machine. After printing, the printing of the third ink mixture 8 is dried through a third drying process 9 where the workpiece is dried in a baking oven at 75~100° C. for about 18~50 minutes. The drying time and drying temperature may be adjusted subject to the type of the third printing ink used.

After the aforesaid third step, it proceeds to the fourth step to print a first ex-design printing 10 on the surface of the printing of the third ink mixture 8 of the third (special) color 7. The first ex-design printing 10 is formed of a fourth ink mixture 11 containing a fourth printing ink, a hardening agent and a bonding agent, and printed on the surface of the printing of the third ink mixture 8 of the third (special) color 7 by the same screen-printing machine. After printing, the fourth ink mixture 11 of the first ex-design printing 10 is dried through a fourth drying process 12 where the workpiece is dried in a baking oven at 75~100° C. for about 18~50 minutes. The drying time and drying temperature may be adjusted subject to the type of the third printing ink used.

After the aforesaid fourth step, it proceeds to the fifth step to print a second ex-design printing 13 on the surface of the fourth ink mixture 11 of the first ex-design printing 10. The second ex-design printing 13 is formed of a fifth ink mixture 14 containing a fifth printing ink, a hardening agent and a bonding agent, and printed on the surface of the fourth ink mixture 11 of the first ex-design printing 10 by the same screen-printing machine. After printing, the fifth ink mixture 14 of the second ex-design printing 13 is dried through a fifth drying process 15 where the workpiece is dried in a baking oven at 75~100° C. for about 18~50 minutes. The drying time and drying temperature may be adjusted subject to the type of the third printing ink used.

After the aforesaid fifth step, it proceeds to the sixth step to print a third ex-design printing 16 on the surface of the fifth ink mixture 14 of the second ex-design printing 13. The third ex-design printing 16 is formed of a bonding agent 17 and directly printed on the surface of the fifth ink mixture 14 of the second ex-design printing 13 by the same screen-printing machine for easy bonding of the laminated printings to the workpiece during further injection molding operation. After printing, the bonding agent 17 of the third ex-design printing 16 is dried through a sixth drying process 18 where the workpiece is dried in a baking oven at 75~100° C. for about 18~50 minutes. The drying time and drying temperature may be adjusted subject to the type of the bonding agent used.

After the aforesaid sixth step, it proceeds to the seventh step to receive a hot work die treatment 19, where the printed thin-film material is embossed by a hot work die into a three-dimensional form (for sealing to the surface of the shell). Because the inks used have good extensibility, embossing the printed thin-film material into a three-dimensional form does not cause the printings to crack.

After the aforesaid seventh step, it proceeds to the eighth step to perform a die-cutting process 20 where a cutting machine is operated to cut the unnecessary part of the think-film material from the three-dimensional form.

After the aforesaid eighth step, it proceeds to the ninth step to perform an injection-molding process 21 where the well-cut three-dimensional form is put in an injection-molding mold and then molded with a plastic material to form the desired finished product (plastic shell having the aforesaid three-dimension form covered thereon) 22.

As indicated above, the screen printing method of the present invention can print on a thin-film material a regular color design as well as a special color design having a metal (silver) or pearl color that provides a shining effect.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A screen printing method comprising the steps of:
   a) using a screen-printing machine to print a first color of a four-color printing on a thin-film material with a first ink mixture containing a first printing ink, a hardening agent and a bonding agent subject to a predetermined design, and then performing a primary drying process to dry said first color;
   b) using said screen-printing machine to print a second color of said four-color printing on said first color with a second ink mixture containing a second printing ink, a hardening agent and a bonding agent subject to said predetermined design, and then performing a secondary drying process to dry said second color;
   c) using said screen-printing machine to print a third (special) color of said four-color printing on said second color with a third ink mixture containing a third printing ink, a hardening agent and a bonding agent subject to said predetermined design, and then performing a third drying process to dry said third color;
   d) using said screen-printing machine to print a first ex-design printing on said third color with a fourth ink mixture containing a fourth printing ink, a hardening agent and a bonding agent, and then performing a fourth drying process to dry said first ex-design printing;
   e) using said screen-printing machine to print a second ex-design printing on said first ex-design printing with a fifth ink mixture containing a fifth printing ink, a hardening agent and a bonding agent, and then performing a fifth drying process to dry said second ex-design printing;

f) using said screen-printing machine to print a third ex-design printing on said second ex-design printing with a printing ink, and then performing a sixth drying process to dry said third ex-design so as to obtain a semi-finished printing work; and g) processing said semi-finished printing work through a hot work die treatment, a die-cutting process, and then an injection-molding process so as to obtain a finished product.

2. The screen-printing method as claimed in claim 1, wherein the hardening agent used in the steps of the screen-printing method protects the respective printing ink against scratching; the bonding agent used in the steps of the screen-printing method increases the adhesion power of the respective printing ink.

3. The screen-printing method as claimed in claim 1, wherein the printing ink used in said third ex-design printing is a bonding agent.

4. The screen-printing method as claimed in claim 1, wherein the printing inks used in the steps of the screen-printing method have a high extensibility to that the printing inks do not crack during said hot work die treatment.

5. The screen-printing method as claimed in claim 1, wherein the drying processes employed during the steps of the screen-printing method are performed in a baking oven at a predetermined temperature for a predetermined length of time subject to the type and thickness of the materials used and the type of the respective printing ink used.

6. The screen-printing method as claimed in claim 1, wherein the drying processes employed during the steps of the screen-printing method are performed in a baking oven at about 75~100° C.

7. The screen-printing method as claimed in claim 1, wherein the drying processed employed during the steps of the screen-printing method are performed in a baking oven at about 75~100° C. for about 18~50 minutes.

8. The screen-printing method as claimed in claim 1, wherein the printing inks used for said four-color printing are determined subject to client's design.

9. The screen-printing method as claimed in claim 1, wherein said hot work die treatment is to emboss said semi-finished printing work into a three-dimensional form with a hot work die.

10. The screen-printing method as claimed in claim 9, wherein said die-cutting process is to cut the unnecessary part of said think-film material from said three-dimensional form.

11. The screen-printing method as claimed in claim 10, wherein said injection-molding process is to put the well-cut three-dimensional form in an injection-molding mold and then to mold the well-cut three-dimensional form with a plastic material so as to form the desired finished product.

* * * * *